United States Patent
Riedl et al.

(10) Patent No.: US 10,752,217 B2
(45) Date of Patent: Aug. 25, 2020

(54) MOTOR VEHICLE

(71) Applicant: Bayerische Motoren Werke Aktiengesellschaft, Munich (DE)

(72) Inventors: Wilhelm Riedl, Pfaffenhofen (DE); Oeztzan Akif, Munich (DE); Gerhard Fichtinger, Grasbrunn (DE); Arne Koehler, Pliening (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 187 days.

(21) Appl. No.: 16/054,727

(22) Filed: Aug. 3, 2018

(65) Prior Publication Data
US 2018/0339679 A1    Nov. 29, 2018

Related U.S. Application Data

(63) Continuation of application No. PCT/EP2017/050812, filed on Jan. 16, 2017.

(30) Foreign Application Priority Data

Feb. 5, 2016  (DE) .................. 10 2016 201 757

(51) Int. Cl.
*B60R 13/07* (2006.01)
*B60S 1/50* (2006.01)
(Continued)

(52) U.S. Cl.
CPC .............. *B60S 1/50* (2013.01); *B62D 21/12* (2013.01); *B62D 25/084* (2013.01); *B62D 25/2027* (2013.01)

(58) Field of Classification Search
CPC .............. B60L 2200/26; Y02T 10/645; Y02T 10/7275; A01M 7/0075; B60G 2400/104;
(Continued)

(56) References Cited

U.S. PATENT DOCUMENTS 4,817,986 A * 4/1989 Kanazawa ........... B62D 7/1527
                                                    280/781
5,511,809 A * 4/1996 Sagi ....................... B62K 13/06
                                                    280/209

(Continued)

FOREIGN PATENT DOCUMENTS

CN    102803049 A    11/2012
DE    298 23 851 U1    2/2000
(Continued)

OTHER PUBLICATIONS

International Search Report (PCT/ISA/210) issued in PCT Application No. PCT/EP2017/050812 dated Apr. 12, 2017 with English translation (seven pages).

(Continued)

*Primary Examiner* — Kiran B Patel
(74) *Attorney, Agent, or Firm* — Crowell & Moring LLP

(57) ABSTRACT

A motor vehicle has a container for receiving liquids arranged in a motor compartment of the motor vehicle in a space-saving manner. The two front end sections of the two front axle supports are connected together by two transverse supports, which are arranged at a distance from each other in the vehicle longitudinal direction, and the container for receiving liquids is arranged in the intermediate space between the two front axle supports.

16 Claims, 3 Drawing Sheets

(51) Int. Cl.
    *B62D 21/12*     (2006.01)
    *B62D 25/08*     (2006.01)
    *B62D 25/20*     (2006.01)

(58) Field of Classification Search
    CPC .... B41M 5/124; B60K 23/0808; B60K 17/35;
                              B60K 23/08; H04S 3/02
    See application file for complete search history.

(56) References Cited

U.S. PATENT DOCUMENTS

| | | | | |
|---|---|---|---|---|
| 8,225,898 | B2* | 7/2012 | Kuwabara | B60K 5/02 |
| | | | | 180/233 |
| 9,428,040 | B2* | 8/2016 | Shibata | B60K 1/00 |
| 2005/0046165 | A1* | 3/2005 | Gomi | B62D 21/152 |
| | | | | 280/781 |
| 2005/0236827 | A1* | 10/2005 | Mouch | B62D 21/11 |
| | | | | 280/788 |
| 2006/0066138 | A1 | 3/2006 | Okana et al. | |
| 2013/0056293 | A1* | 3/2013 | Schurna | B62D 23/005 |
| | | | | 180/68.5 |
| 2013/0076069 | A1 | 3/2013 | Fuchs et al. | |
| 2015/0123419 | A1* | 5/2015 | Werum | B62D 29/046 |
| | | | | 296/24.43 |
| 2015/0266513 | A1* | 9/2015 | Riedl | B62D 29/043 |
| | | | | 296/203.02 |
| 2015/0274211 | A1* | 10/2015 | Riedl | B62D 25/084 |
| | | | | 296/187.09 |
| 2017/0197663 | A1* | 7/2017 | Schuster | B62D 25/082 |
| 2017/0259852 | A1* | 9/2017 | Akif | B62D 21/152 |
| 2019/0283561 | A1* | 9/2019 | Battaglia | B60G 7/001 |

FOREIGN PATENT DOCUMENTS

| | | |
|---|---|---|
| DE | 102 27 635 A1 | 1/2004 |
| DE | 203 12 500 U1 | 12/2004 |
| DE | 103 35 258 A1 | 3/2005 |
| DE | 20 2005 006 305 U1 | 1/2006 |
| DE | 10 2007 002 679 A1 | 7/2008 |
| DE | 60 2005 003 737 T2 | 12/2008 |
| DE | 20 2010 008 375 U1 | 11/2011 |
| DE | 10 2010 044 221 A1 | 3/2012 |
| DE | 10 2010 051 819 A1 | 5/2012 |
| EP | 2 719 565 A1 | 4/2014 |
| FR | 2 933 056 A3 | 1/2010 |
| GB | 2479980 A | 11/2011 |
| JP | 62-16378 Y2 | 4/1987 |
| JP | 2004-284438 A | 10/2004 |
| WO | WO 2014/086596 A1 | 6/2014 |

OTHER PUBLICATIONS

German-language Written Opinion (PCT/ISA/237) issued in PCT Application No. PCT/EP2017/050812 dated Apr. 12, 2017 (five pages).

German-language Search Report issued in counterpart German Application No. 10 2016 201 757.8 dated Sep. 19, 2016 with partial English translation (13 pages).

Chinese-language Office Action issued in Chinese Application No. 201780009446.2 dated Mar. 25, 2020 with English translation (13 pages).

* cited by examiner

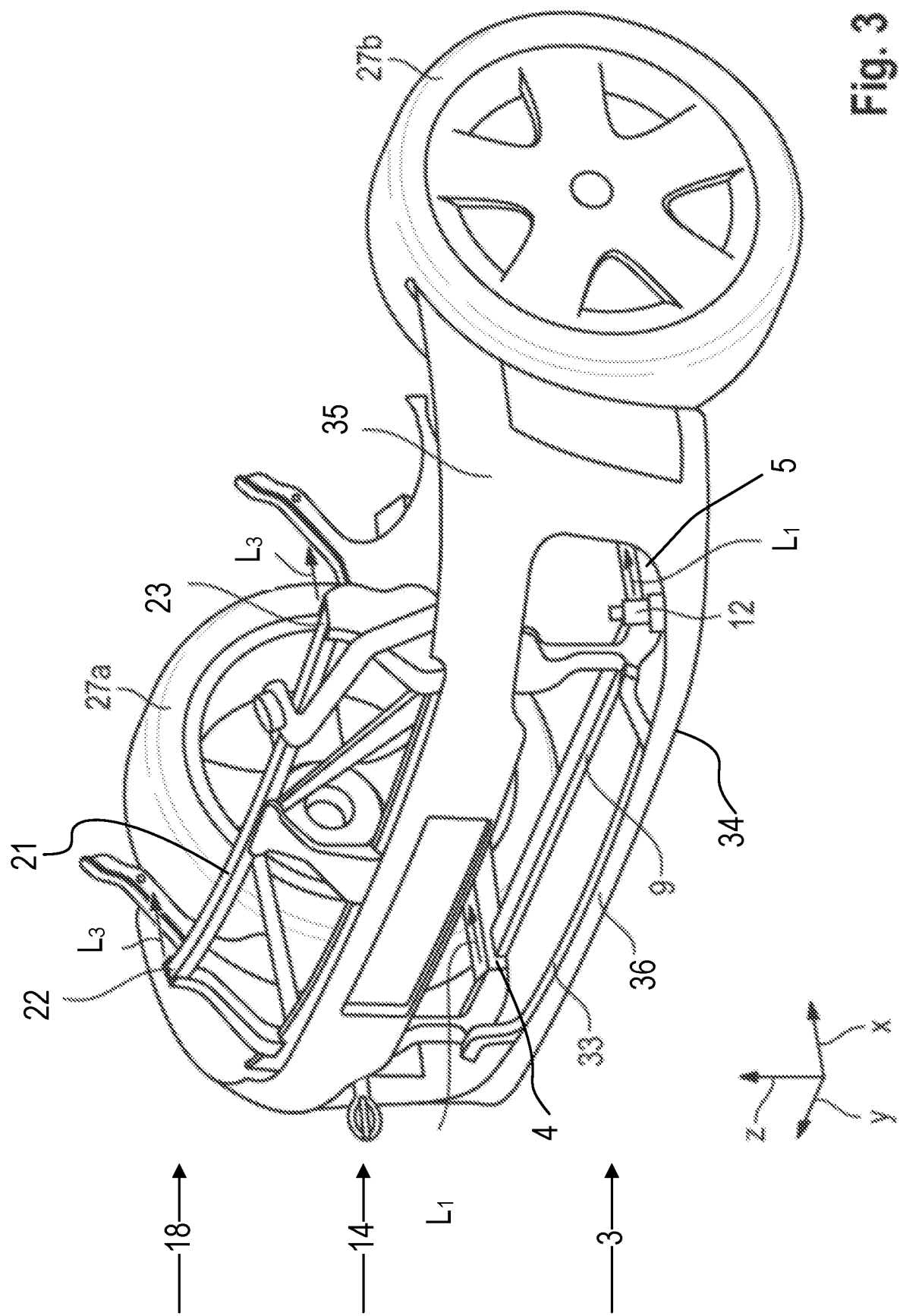

MOTOR VEHICLE

CROSS REFERENCE TO RELATED APPLICATIONS

This application is a continuation of PCT International Application No. PCT/EP2017/050812, filed Jan. 16, 2017, which claims priority under 35 U.S.C. § 119 from German Patent Application No. 10 2016 201 757.8, filed Feb. 5, 2016, the entire disclosures of which are herein expressly incorporated by reference.

BACKGROUND AND SUMMARY OF THE INVENTION

The invention relates to a motor vehicle with a front structure, wherein in a lower load plane of the front structure, two front axle supports which are laterally spaced from one another extend in the vehicle longitudinal direction.

It is known to arrange containers for liquids in a motor compartment of a motor vehicle.

One object of the invention is to create a motor vehicle, in the case of which a container for liquids is arranged in a motor compartment.

This and other objects are achieved by a motor vehicle with a front structure, wherein in a lower load plane of the front structure, two front axle supports which are laterally spaced from one another extend in the vehicle longitudinal direction. The two front end sections of the two front axle supports are connected to one another by two crossmembers which, in the longitudinal vehicle direction, are spaced from one another by a distance. In an intermediate space between the two front axle supports a container for receiving liquids is arranged.

A motor vehicle according to the invention comprises a front structure. In a lower load plane of the front structure, two front axle supports which are laterally spaced from one another extend in the vehicle longitudinal direction.

Advantageously, the two front end sections of the two front axle supports are connected to one another by two crossmembers which, in the vehicle longitudinal direction are spaced from one another by a predetermined distance. In an intermediate space between the two front axle supports, a container for receiving liquids is arranged.

In an advantageous embodiment, three load planes with load paths are formed in body components such as side members and crossmembers for receiving and passing on loads or forces, which are generated during a vehicle collision.

Spaced from the lower load plane of the front structure in the vertical direction z in a middle load plane, two (motor) side members which are laterally spaced from one another are arranged.

In an upper load plane, which is spaced from the middle load plane in the vertical direction z, two side members are arranged. Both the side members extend in the vehicle longitudinal direction, in the direction of a front wall of a passenger cell of the motor vehicle.

The two (motor) side members are advantageously connected to one another by a bumper extending in the vehicle transverse direction. The side members of the upper load plane are connected to one another via the front ends of an upper crossmember.

In an advantageous embodiment, a height of the container corresponds to a maximum height of the crossmembers.

Advantageously, the height of the container is in a maximum range of 2 cm≤h≤6 cm.

In an advantageous embodiment, a front transverse section of the container is fastened to the front crossmember. A rear transverse section of the container is fastened to the rear crossmember.

At least one pumping device is advantageously arranged on the container. The pumping device is connected to a filler pipe of the container.

Advantageously, the container, a housing of the pumping device and the filler pipe are produced in one part or two parts.

In an advantageous embodiment, the pumping device is provided with at least one sensor for measuring and/or for indicating values and/or states in the container.

The respective sensor advantageously measures at least the liquid (water) level and generates a warning signal.

In an advantageous embodiment, on a free end the filler pipe comprises a detachable closure.

Advantageously, the container, the housing of the pumping device and the filler pipe are produced from plastic.

In an advantageous embodiment, the plastic of the container, of the housing of the pumping device and of the filler pipe is polypropylene.

The container, the housing of the pumping device and the filler pipe is advantageously a blow-molded part.

In an advantageous embodiment, the container, the filler pipe and the housing of the pumping device are produced from two shells.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a perspective view from the side corresponding to FIG. 1, wherein in FIG. 3 a trim component designed as front apron is additionally shown.

DETAILED DESCRIPTION OF THE DRAWINGS

Figure 1:
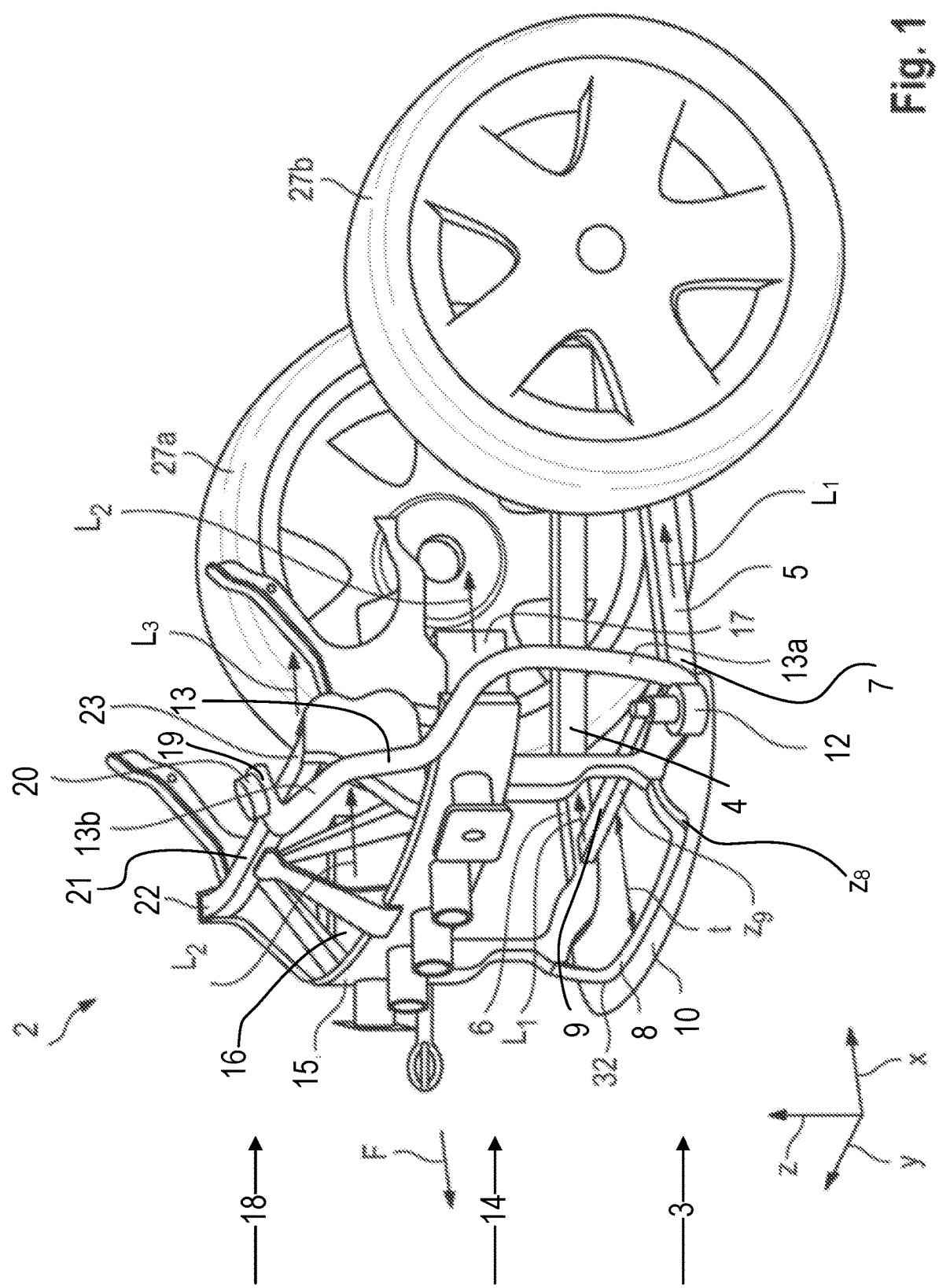
FIG. 1 is a perspective view from the side of a partly shown front structure of a motor vehicle according to an embodiment of the invention.

FIG. 1 shows a partly represented front structure 2 of a motor vehicle (not shown). In the front structure 2 of the motor vehicle, a motor (not shown) is arranged in a motor compartment provided for this purpose.

For receiving forces during a vehicle collision, three load planes are formed in the shown embodiment in the front structure 2 of the motor vehicle, which consist of a lower load plane 3, a middle load plane 14 and an upper load plane 18. In the FIGS. 1, 2, 3, the two front wheels 27a and 27b are additionally shown.

The distribution of the forces acting on the load planes 3, 14, 18 is effected by load paths $L_1$, $L_2$ and $L_3$. In the shown embodiment, the load paths $L_1$, $L_2$ and $L_3$ consist of side members and crossmembers described in the following.

In the lower load plane 3, two front axle supports 4 and 5 which extend in the vehicle longitudinal direction x and which are laterally spaced from one another in the vehicle transverse direction y are shown.

The two front axle supports 4 and 5 are connected to one another at their respective front end section 6, 7 via two crossmembers 8 and 9 which extend in the vehicle transverse direction y and are spaced from one another by a distance t in the vehicle longitudinal direction x.

Between the two crossmembers 8 and 9 and the front end sections 6 and 7 of the front axle supports 4 and 5, a container 10 for receiving liquids is fastened. In the shown embodiment, a pumping device 12 is arranged on a, seen in the traveling direction F, left corner section of the container 10.

In one embodiment, the container 10 has a volume of 1 to 3 liters of liquid. Not shown are connections and lines which, for example, lead to a motor for a water injection or to spray nozzles for a windshield wiper system.

The pumping device 12 is provided with at least one sensor for measuring and/or for indicating values and/or states in the container 10. The respective sensor measures at least the liquid (water) level and generates a warning signal. The warning signal can be given acoustically and/or visually, for example via a display in the instrument panel.

In one embodiment, a height $h_{10}$ of the container 10 maximally corresponds to a height $z_{8,9}$ of the crossmembers 8, 9. The height of the container 10 is in a maximum range of $2\ cm \leq h_{10} \leq 6\ cm$. In one embodiment, the container 10 has a flat or disk-like shape as shown in the FIGS. 1 to 3. Because of this, for example an adequate ground clearance is ensured, i.e. a distance between a lower side 10*a* of the container 10 and a ground or a road.

The pumping device 12 is followed by a filler pipe 13. In the shown embodiment, the filler pipe in a first section 13*a* substantially extends in the z-direction perpendicularly upward as far as to approximately into the middle load plane 14.

Corresponding to the existing installation space, the filler pipe 13 in a second section 13*b* extends upward in the vertical direction z as far as into the upper load plane 18. A free end 19 of the filler pipe 13 is closeable by a cap 20 or the like. The free end 19 of the filler pipe 13 is arranged on an upper crossmember 21 of the upper load plane 18.

On two opposite ends 22, 23 of the upper crossmember 21, side members which are not shown follow, which terminate on a front wall of a passenger cell of the motor vehicle which is not shown.

In the middle load plane 14, a bumper 15 extends in the vehicle transverse direction y. In the vehicle longitudinal direction, the bumper 15 supports itself on two motor supports 16, 17. The motor supports 16, 17 extend in the vehicle longitudinal direction x and are spaced from one another in the vehicle transverse direction y.

As is shown in FIG. 1 by arrows associated with $L_1$ in the front axle supports 4, 5 in the lower load plane 3, forces can be transmitted in the direction of the arrows associated with $L_1$ to the respective front axle supports 4, 5 of the lower load plane 3.

In the direction of the arrows associated with load path $L_2$, forces at the motor supports 16, 17 can be received in the middle load plane 14 by the respective motor supports 16, 17 of the middle load plane 14.

As is shown by arrows 26 on the ends 22, 23 of the crossmember 21 in the upper load plane 18 in the vehicle longitudinal direction x, forces can be transmitted, in the direction of the arrows 26, to the side members of the upper load plane 18 which are not shown, which follow the opposite ends 22, 23 of the upper crossmember 21. Such forces can be generated during a rear-end collision or collision of the motor vehicle.

As is evident from FIG. 1, the container 10, on the front transverse section 30, has a recess 32, the shape and size of which is matched to the cross section of the front crossmember 8, so that at least a section of the crossmember 8 extending in the vehicle transverse direction y is retained in a positively locked manner.

Figure 2:
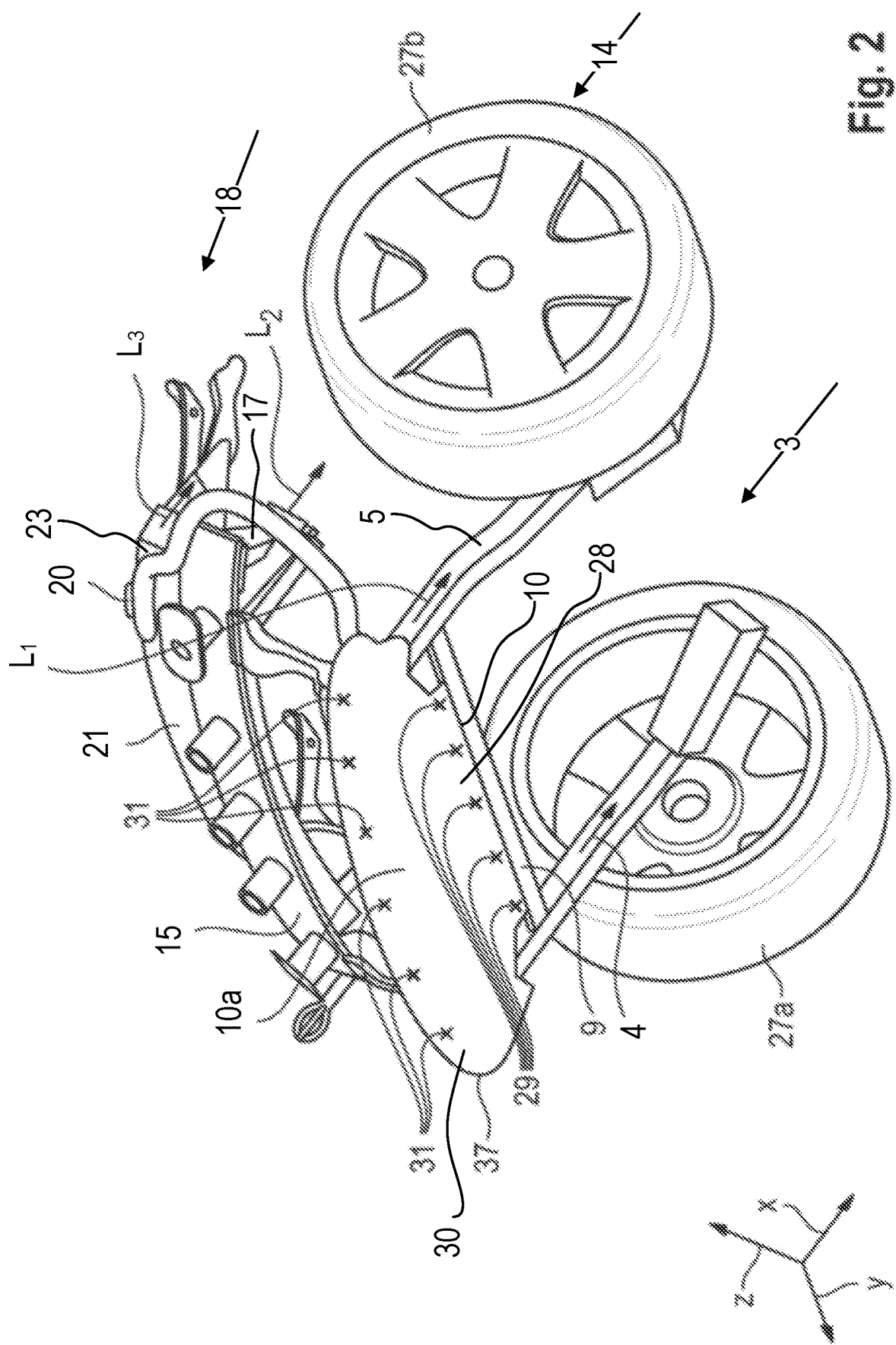
FIG. 2 is a perspective view from below of the front structure shown in FIG. 1.

FIG. 2 shows the arrangement of the container 10 in a view from below. A rear transverse section 28 of the container 10 is fastened to the rear crossmember 9, as is marked by five fastening points 29. A front transverse section 30 of the container 10 is fastened to the front crossmember 8 of the lower load plane 3 for example via six fastening points 31.

In addition to the representations of FIGS. 1 and 2, FIG. 3 shows the arrangement of a trim component 34. In the shown embodiment, the trim component 34 is designed as a front apron or bumper apron.

The front apron has a through-opening 35 for example for a radiator which is not shown. A lower cross section 36 of the trim component 34 surrounds a front region 37 of the front transverse section 30 of the container 10.

The container 10, a housing of the pumping device 12 and the filler pipe 13 are produced in one part or two parts, for example from plastic. In an embodiment, the plastic of the container 10, of the housing of the pumping device 12 and of the filler pipe 13 is polypropylene.

The container 10, the housing of the pumping device 12 and the filler pipe 13 is a one-piece blow-molded part for example. In another embodiment, the container 10, the filler pipe 13 and the housing of the pumping device 12 are produced from two shells.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A motor vehicle with a front structure, comprising:
   two front axle supports, which are laterally spaced from one another, extending in a vehicle longitudinal direction in a lower load plane of the front structure;
   two crossmembers connecting two front end sections of the two front axle supports to one another, wherein the two crossmembers are spaced from one another in the vehicle longitudinal direction by a defined distance; and
   a container configured to receive liquid arranged in an intermediate space between the two front axle supports.

2. The motor vehicle as claimed in claim 1, wherein spaced from the lower load plane of the front structure in a vertical direction in a middle load plane, two motor side members, which are laterally spaced from one another, are arranged.

3. The motor vehicle as claimed in claim 2, wherein in an upper load plane, which is spaced from the middle load plane in the vertical direction, two side members are arranged, which two side members extend in the vehicle longitudinal direction, toward a front wall of a passenger cell of the motor vehicle.

4. The motor vehicle as claimed in claim 3, wherein the two motor side members are connected to one another by a bumper extending in the vehicle transverse direction, and
   the side members of the upper load plane are connected to one another via front ends of an upper crossmember.

5. The motor vehicle as claimed in claim 1, wherein a height of the container corresponds to a height of the crossmembers.

6. The motor vehicle as claimed in claim 1, wherein a height of the container is in a maximum range of 2 cm≤h≤6 cm.

7. The motor vehicle as claimed in claim 1, wherein a front transverse section of the container is fastened to a front one of the crossmembers, and a rear transverse section of the container is fastened to a rear one of the crossmembers.

8. The motor vehicle as claimed in claim 1, wherein at least one pumping device is arranged on the container, and the pumping device is connected to a filler pipe of the container.

9. The motor vehicle as claimed in claim 8, wherein the container, a housing of the pumping device and the filler pipe are produced in one part or two parts.

10. The motor vehicle as claimed in claim 8, wherein the pumping device is provided with at least one sensor for measuring and/or for indicating values and/or states in the container.

11. The motor vehicle as claimed in claim 10, wherein the at least one respective sensor measures at least a liquid level and generates a warning signal.

12. The motor vehicle as claimed in claim 8, wherein on a free end, the filler pipe comprises a detachable closure.

13. The motor vehicle as claimed in claim 9, wherein the container, the housing of the pumping device and the filler pipe are produced from plastic.

14. The motor vehicle as claimed in claim 13, wherein the plastic of the container, the housing of the pumping device and the filler pipe is polypropylene.

15. The motor vehicle as claimed in claim 9, wherein the housing of the pumping device and the filler pipe is a blow-molded part.

16. The motor vehicle as claimed in claim 9, wherein the container, the filler pipe and the housing of the pumping device are produced from two shells.

* * * * *